G. B. VAUGHAN.
Plows.

No. 151,732. Patented June 9, 1874.

Horizontal sec.
Thro' a'a' fig. 1.

Witnesses
James Thurlow
Clarence Thurlow

Inventor.
George B. Vaughan
by E. Thurlow
his Atty

UNITED STATES PATENT OFFICE

GEORGE B. VAUGHAN, OF MARSHALL, MISSOURI.

IMPROVEMENT IN PLOWS.

Specification forming part of Letters Patent No. 151,732, dated June 9, 1874; application filed February 7, 1874.

*To all whom it may concern:*

Be it known that I, GEORGE B. VAUGHAN, of Marshall, in the county of Saline and in the State of Missouri, have invented an Improvement in Plows; and do hereby declare that the following is a full, clear, and exact description thereof, reference being had to the annexed drawings making a part of this specification, in which like letters of reference refer to like parts, and in which—

Figure 1:
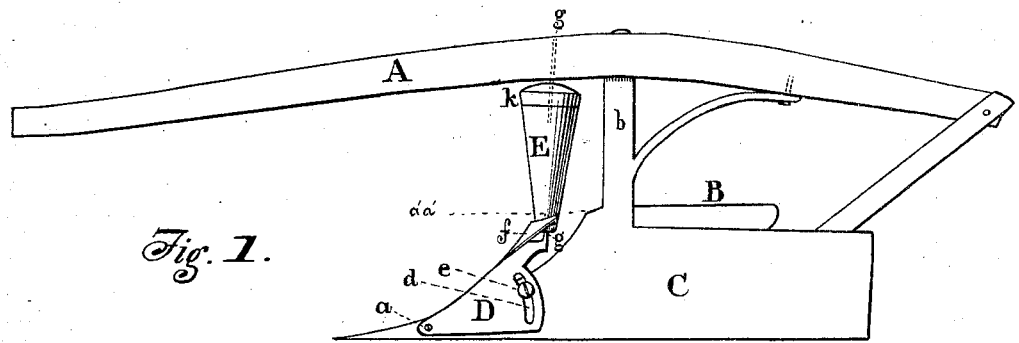
Figure 2:
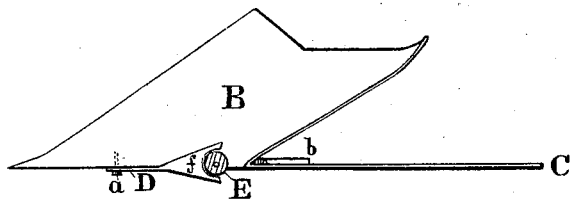
Figure 3:
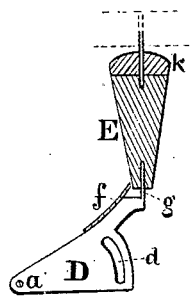

Figure 1 represents an elevation of plow cutter and fender or roller, seen from a point opposite the land-sides; Fig. 2, a plan or superficial view of mold-board, land-sides, cutter, and horizontal section of the roller; Fig. 3, an elevation of cutter and roller, the guard *f* and the roller seen in vertical section.

This invention is an improvement on the patent granted by the United States to me on 20th May, 1873, for a plow or plow-fender, No. 139,036; and consists in the use of a triangular-shaped cutter or share pivoted to the forward part of the land-side, and rising diagonally above the edge of the mold-board, its free end forming the pivot and support of the fender or weed-roller, which is made in horizontal sections to lengthen or shorten it, as desired. The cutter is also provided with a curved slot at its rear end, and an adjusting-screw passing through it into the land-side to raise or lower the roller expressly for the purpose of lengthening or of shortening the latter by introducing or removing its horizontal upper section from its spindle to suit the depth of the furrow in plowing. The usual guard rides upon that part of the cutter at the base of the roller to keep away weeds from the pivot.

The following is a description of the form in which I construct the cutter and roller: A represents the plow-beam; B, the mold-board; C, the land-side; D, a vertical cutter or share, of a triangular form, pivoted at *a*, at its forward corner, to the forward end of the land-side lying snugly against it, and rising gradually backward above the mold-board, with a cutting-edge, and terminating in a short arm, which forms the pivot of the roller E, which arm and the base of the roller are covered by the usual guard or sloping plate *f*. The rear part of the cutter is pierced with a curved slot, *d*, (whose center is the pivot *a*,) through which an adjusting-screw, *e*, passes into the land-side. It will be seen that the guard *f*, in this case, is not attached to the mold-board or land-side, but to the movable cutter D, so as to follow or accompany the base of the roller, and free the spindle *g* or its pivot from weeds. E represents the rotary fender or roller, which frees the plow from weeds, &c., made in the usual shape—an inverted conic frustum; but the upper end is supplied with one, two, or more horizontal sections, *k*, which are centered upon the same spindle, *g*, which carries the roller, and are taken off or added, as deeper or shallower plowing may require, by lowering the cutter and disengaging the upper end of the spindle from the beam A.

The operation of this cutter and roller is as follows: The cutter D severs the sod, and is adjustable by means of the screw *e* in the slot *d*, to admit of removing or adding extra circular roller-sections *k* on the upper end of the roller or fender E.

What I claim as my invention is—

A combined sod-cutter and fender-support, D, having a forward pivot, *a*, a slot, *d*, with an adjusting-screw, *e*, to raise or lower it, and the fender-pivot at its top to introduce or remove extra sections above the roller E for deep or shallow plowing, substantially as and for the purposes described.

In testimony that I claim the foregoing improvement in plows I have hereunto set my hand.

GEO. B. VAUGHAN.

Witnesses:
 EDW. P. GARNETT,
 THOMAS I. YERBY.